(12) United States Patent
Ding (10) Patent No.: US 11,687,188 B2
(45) Date of Patent: Jun. 27, 2023

(54) INPUT DEVICE WITH NEAR-FIELD COMMUNICATION

(71) Applicant: Synaptics Incorporated, San Jose, CA (US)

(72) Inventor: Wei Ding, Shanghai (CN)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/483,781

(22) Filed: Sep. 23, 2021

(65) Prior Publication Data

US 2023/0093441 A1    Mar. 23, 2023

(51) Int. Cl.
| | |
|---|---|
| *G06F 3/01* | (2006.01) |
| *G06F 3/041* | (2006.01) |
| *H04B 5/00* | (2006.01) |
| *G06F 3/0354* | (2013.01) |
| *G06F 3/04883* | (2022.01) |

(52) U.S. Cl.
CPC ...... *G06F 3/04164* (2019.05); *G06F 3/03547* (2013.01); *G06F 3/04883* (2013.01); *H04B 5/0043* (2013.01)

(58) Field of Classification Search
None
See application file for complete search history.

(56) References Cited

U.S. PATENT DOCUMENTS

| | | | |
|---|---|---|---|
| 7,306,144 B2 | 12/2007 | Moore | |
| 2016/0315667 A1* | 10/2016 | Jensen | H04B 5/0081 |
| 2017/0262120 A1* | 9/2017 | Liu | G06F 3/0446 |
| 2017/0272127 A1* | 9/2017 | Jang | H04B 5/0056 |
| 2022/0006172 A1* | 1/2022 | Wang | G06F 1/1681 |

\* cited by examiner

*Primary Examiner* — Krishna P Neupane
(74) *Attorney, Agent, or Firm* — Ferguson Braswell Fraser Kubasta PC (57) ABSTRACT

An input device includes a touchpad and a mounting bracket made of an electrically conductive material and configured to anchor the touchpad in an electronic system. The input device further includes a near field communication (NFC) controller, and an antenna electrically interfaced with the NFC controller. The antenna includes an electrically conductive strip formed by a segment of the mounting bracket.

9 Claims, 6 Drawing Sheets

NFC Performance Testing Results 600

| | Antenna width | 3v | | | | 5v | | | |
|---|---|---|---|---|---|---|---|---|---|
| | voltage | 5mm | 3mm | 2mm | 1mm | 5mm | 3mm | 2mm | 1mm |
| NFC Card/Tag | Type 1 | 3.6 cm | 3.6 cm | 3.5 cm | 3.5 cm | 4.4 cm | 4.3 cm | 4.2 cm | 4.0 cm |
| | Type 2 | 4.0 cm | 4.0 cm | 3.6 cm | 3.5 cm | 4.5 cm | 4.5 cm | 4.3 cm | 4.2 cm |
| | Type 3 | 3.1 cm | 3.1 cm | 3.0 cm | 2.9 cm | 3.4 cm | 3.4 cm | 3.7 cm | 3.6 cm |
| | Type 4 | 2.8 cm | 2.8 cm | 2.2 cm | 2.1 cm | 2.8 cm | 3.0 cm | 3.0 cm | 2.8 cm |
| Card Emulation | VIVO Pay 5000 | 7.8 cm | 7.8 cm | 7.8 cm | 7.5 cm | 10.5 cm | 10.5 cm | 10.3 cm | 10.0 cm |

FIG. 6A

NFC Performance Testing Results 650

| | Antenna width | 3v | | | | 5v | | | |
|---|---|---|---|---|---|---|---|---|---|
| | voltage | 5mm | 3mm | 2mm | 1mm | 5mm | 3mm | 2mm | 1mm |
| | Impedance | 8.08 ohm | 7.82 ohm | 7.78 ohm | 7.81 ohm | 8.08 ohm | 7.82 ohm | 7.78 ohm | 7.81 ohm |
| NFC Card/Tag | Type 1 | 3.9 cm | 4.1 cm | 4.0 cm | 4.1 cm | 5.0 cm | 5.0 cm | 5.0 cm | 5.1 cm |
| | Type 2 | 4.0 cm | 4.2 cm | 4.0 cm | 4.2 cm | 5.2 cm | 5.2 cm | 5.2 cm | 5.2 cm |
| | Type 3 | 3.2 cm | 3.5 cm | 3.4 cm | 3.5 cm | 4.2 cm | 4.4 cm | 4.4 cm | 4.5 cm |
| | Type 4 | 2.4 cm | 2.5 cm | 2.4 cm | 2.5 cm | 3.4 cm | 3.5 cm | 3.5 cm | 3.5 cm |
| Card Emulation | VIVO Pay 5000 | 8.2 cm | 8.3 cm | 8.0 cm | 8.0 cm | 11.3 cm | 11.8 cm | 11.2 cm | 11.5 cm |

FIG. 6B

INPUT DEVICE WITH NEAR-FIELD COMMUNICATION

TECHNICAL FIELD

The described embodiments relate generally to electronic devices, and more specifically, to touch and/or force input devices with near-field communication (NFC) functionality.

BACKGROUND

Input devices including proximity sensor devices (e.g., touchpads or touch sensor devices, including force sensor devices) are widely used in a variety of electronic systems. An input device typically includes a sensing region, often demarked by a surface, in which the input device determines the presence, location motion and/or force of one or more input objects. Input devices may be integrated in larger computing systems (such as touchpads integrated in, or peripheral to, notebook or desktop computers). Input devices are also often used in smaller computing systems (such as touch screens integrated in cellular phones). Input devices may be used to detect fingers, styli, or other input objects. Input devices may further be equipped with additional components configured to perform NFC communications.

SUMMARY

In general, in one aspect, one or more embodiments relate to an input device, comprising: a touchpad; a mounting bracket made of an electrically conductive material and configured to anchor the touchpad in an electronic system; a near field communication (NFC) controller; and an antenna electrically interfaced with the NFC controller, wherein the antenna comprises an electrically conductive strip formed by a segment of the mounting bracket.

In general, in one aspect, one or more embodiments relate to an input device comprising: a touchpad; a near field communication (NFC) controller; and an antenna electrically interfaced with the NFC controller, the antenna comprising an antenna rod, wherein the antenna rod is straight and disposed outside a perimeter of the touchpad.

Other aspects of the embodiments will be apparent from the following description and the appended claims.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, brief summary, brief description of drawings, or the following detailed description.

Throughout the application, ordinal numbers (e.g., first, second, third, etc.) may be used as an adjective for an element (i.e., any noun in the application). With the exception of the four consecutive quarter cycles, the use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments provide input devices and methods that may facilitate improved usability along with various other benefits. Embodiments of the disclosure may be used for touch and/or force sensing and further include NFC functionality. Accordingly, an input device in accordance with one or more embodiments may be used to communicate with NFC devices or media such as NFC tags, NFC cards such as payment media, when these NFC devices or media are in proximity to the input device. In one or more embodiments, the input device includes an antenna enabling the NFC functionality. The antenna may be integrated with other components of the input device in a cost-effective manner, while providing superior performance, as discussed below.

Figure 1:
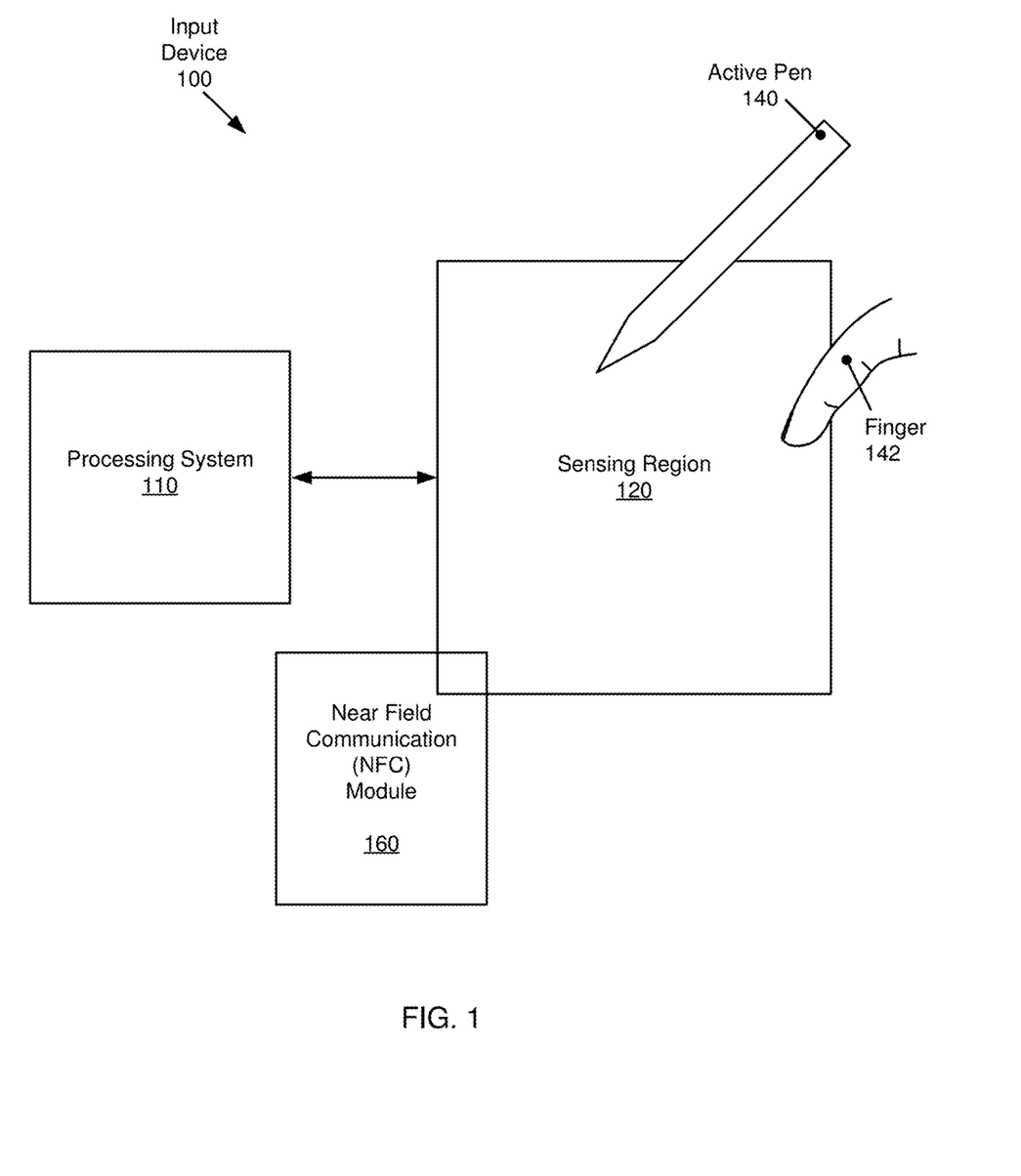
FIG. 1 shows a block diagram of an input device, in accordance with one or more embodiments.

FIG. 1 is a block diagram of an exemplary input device (100), in accordance with embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

In FIG. 1, the input device (100) is shown as a proximity sensor device (e.g., "touchpad" or a "touch sensor device") configured to sense input provided by one or more input objects in a sensing region (120). Example input objects include an active pen (140), one or more fingers (142), etc.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. The sensing elements may be capacitive.

In some capacitive implementations of the input device (100), voltage or current is applied to create an electric field. Nearby input objects cause changes in the electric field and produce detectable changes in capacitive coupling that may be detected as changes in voltage, current, or the like.

Some capacitive implementations utilize "self capacitance" (or "absolute capacitance") sensing methods based on changes in the capacitive coupling between sensor electrodes and an input object. Some capacitive implementations utilize "mutual capacitance" (or "trans capacitance") sensing methods based on changes in the capacitive coupling between sensor electrodes when an input object near the sensor electrodes alters the electric field between the sensor electrodes, thus changing the measured capacitive coupling.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. A processing system may further include receiver circuitry configured to receive signals emitted by a different source, e.g., an active pen.

In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. The modules may include functionality to determine when at least one input object is in a sensing region, determine signal to noise ratio, determine positional information of an input object, identify a gesture, determine an action to perform based on the gesture, a combination of gestures or other information, and/or perform other operations. The modules may include functionality to drive the sensing elements to transmit transmitter signals and receive the resulting signals, when performing a capacitive sensing.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

In one or more embodiments, the input device (100) include a near field communication (NFC) module (160). The NFC module (160) may enable communication with NFC devices, when the NFC devices are in proximity to the NFC module (160). An NFC device may include a chip with storage and/or processing capabilities and a communication interface configured to communicate with the NFC module (160). When the NFC device is close enough to the NFC module (160), the NFC device may be inductively powered by the emissions of the NFC module (160), enabling the NFC device to communicate (send and/or receive) with the NFC module (160). The NFC module (160) and the integration with other components of the input device is subsequently discussed in reference to FIGS. 2A, 2B, 3, 4A, 4B, and 5.

While FIG. 1 shows a configuration of components, other configurations may be used without departing from the scope of the disclosure. For example, various components may be combined to create a single component. As another example, the functionality performed by a single component may be performed by two or more components.

Figure 2A:
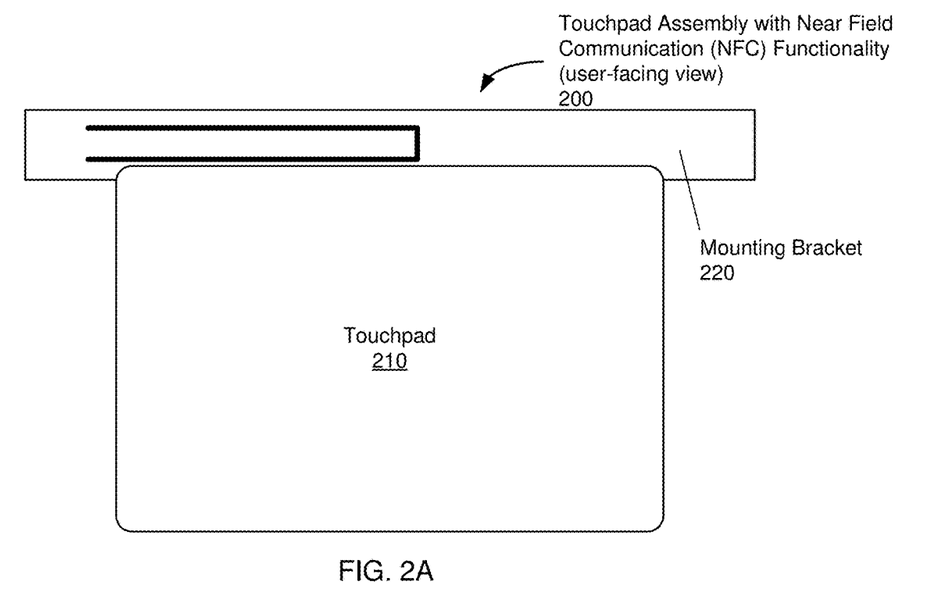
FIGS. 2A and 2B show a touchpad assembly with NFC functionality, in accordance with one or more embodiments.
Figure 2B:
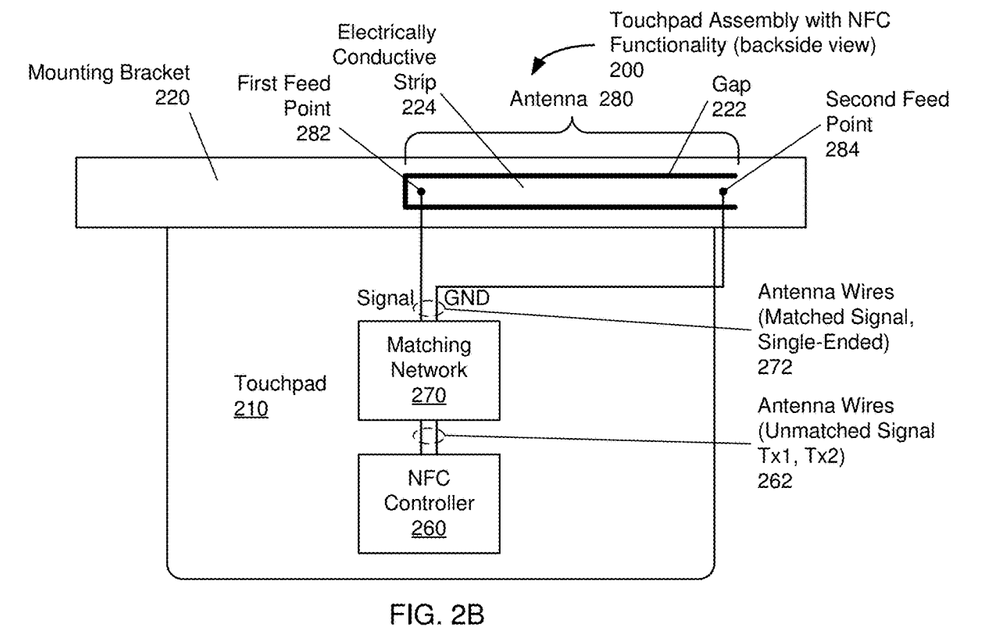

Turning to FIGS. 2A and 2B, a touchpad assembly with NFC functionality, in accordance with one or more embodiments, is shown. FIG. 2A provides a user-facing view of the touchpad assembly with NFC functionality (200), and FIG. 2B provides a backside view of the touchpad assembly with NFC functionality (200).

The touchpad assembly shown in FIGS. 2A and 2B includes a touchpad (210), a mounting bracket (220), and various elements of the NFC module (160), such as an NFC controller (260), and an antenna (280). Various other components of the NFC module (160) may be included, such as a matching network (270) and/or antenna wires (262, 272). Each of these components is subsequently described.

The touchpad (210) may be any kind of touchpad providing a sensing region, as previously described. The mounting bracket (220) may be any kind of mechanical structure suitable to anchor the touchpad (210) in an electronic system, such as a laptop, a payment terminal, a gaming device, etc. In one or more embodiments, the mounting bracket (220) is made of an electrically conductive material, e.g., a metal, or a metalized material. The mounting bracket (220) may be of any shape and/or size and may be in any configuration, e.g., in the form of a bezel. The mounting bracket (220) may include mechanical features for anchoring the mounting bracket in the electronic system. For example, the mounting bracket may include screw holes, clips, etc. The touchpad (210) may be glued, screwed, clipped, or otherwise mechanically attached to the mounting bracket (220).

In one or more embodiments, a segment of the mounting bracket (220) forms an electrically conductive strip (224) that is used as a component of the antenna (280). As illustrated in FIGS. 2A and 2B, the electrically conductive strip (224) may be surrounded by a U-shaped gap (222) resulting in a partial separation of the electrically conductive strip (224) and the mounting bracket (220). Specifically, the partial separation establishes a free end and a connected end of the electrically conductive strip (224). The free end is separated from the main body of the mounting bracket (220) by the gap, whereas the connected end provides a transition between the electrically conductive strip (224) and the main body of the mounting bracket (220). The electrically conductive strip (224) may have a length and a width. In one or more embodiments, the electrically conductive strip is straight and does not include a coiled section. In one embodiment, the electrically conductive strip (224) is disposed outside the perimeter of the touchpad (210). The free end of the electrically conductive strip (224) provides a first feed point (282) of the antenna (280). The connected end of the electrically conductive strip (224) provides a second feed point (284) of the antenna (280). While a rectangular electrically conductive strip (224) is shown in FIG. 2B, other shapes may be used, without departing from the disclosure. A discussion of the use of the electrically conductive strip (224) to form the antenna (280) is provided below.

The NFC controller (260) may be any type of NFC controller for transmitting and/or receiving NFC data using the antenna (280). On an input side (not shown), the NFC controller (260) may interface with a computing system (not shown), which may control the operation (transmitting/receiving behavior) of the NFC controller (260). On an output side, the NFC controller may interface with the antenna (280) to power an NFC device and to receive/transmit data from/to the NFC device. The interface with the antenna (280) may be via two antenna wires (262). In one or more embodiments, the signal provided at the output of the NFC controller (260) via the two antenna wires (262) is a differential signal consisting of Tx1 and Tx2. Alternatively, the signal provided at the output of the NFC controller (260) via the two antenna wires (262) may be a single-ended signal. The NFC controller (260) may be designed to operate in conjunction with a conventional coil-shaped NFC antenna with a specific impedance. In one or more embodiments, the impedance of the antenna (280) is different from the impedance of the conventional NFC antenna. One or more embodiments of the disclosure include a matching network (270) between the NFC controller (260) and the antenna (280) to compensate for the difference in impedance between the NFC controller (260) (designed to operate with a conventional NFC antenna) and the antenna (280). The matching network (270) may perform an impedance matching between the NFC controller (260) and the antenna (280). The matching network may further perform a conversion between the differential signal of the NFC controller (260) and a single-ended signal required by the antenna (280). The antenna (280) may require a single-ended signal because the mounting bracket (220) may be grounded (e.g., connected to a ground of an electronic system). Accordingly, at the output of the matching network (270), a first of the two antenna wires (272) may carry the signal to the first feed point (282) at the free end of the electrically conductive strip (224), and a second of the two antenna wires (272) may connect the ground (GND) of the matching network (270) to the second feed point (284) at the connected end of the electrically conductive strip (224). The ground of the matching network (270) is, thus, directly electrically connected to the ground of the electronic system, at the mounting bracket (220).

As illustrated in FIG. 2B, the NFC controller (260), the matching network (270), and/or other components may be placed on the backside (bottom) of the touchpad (210). The NFC controller (260), the matching network (270), and/or the other components may be mounted on a printed circuit board (PCB) that may also support components of the touchpad, e.g., sensor electrodes, traces for the sensor electrodes, and/or elements of the processing system (110), etc.

When operating the NFC module (160), the NFC controller (260) outputs a voltage to drive the antenna (280). The voltage may be modulated at a base frequency of, for example, 13.56 MHz. The resulting alternating current in the antenna (280) generates an electromagnetic field surrounding the elements of the antenna (280), such as the electrically conductive strip (224), but also the antenna wire (272) carrying the signal. Generally, a stronger electromagnetic field is obtained by driving the antenna with higher voltages, thereby increasing the current in the antenna. Further, a larger antenna may result in an increased size of the region where the electromagnetic field is provided. Accordingly, the electrically conductive strip (224) may have a certain length, for example, at least 3 cm, at least 4 cm, or at least 5 cm. When an NFC device is sufficiently close to the antenna (280), the electromagnetic field may induce a current in an antenna of the NFC device, thus enabling operation of the NFC device.

Broadly speaking, the NFC module (160) equipped with the antenna (280) may operate similar to NFC modules with conventional NFC antennas. However, unlike a conventional NFC antenna, the antenna (280) does not include a dedicated coil or a ferrite. As a result, no dedicated, antenna-specific elements are required for the antenna (280), with the electrically conductive strip serving as the antenna (280). The repurposing of a segment of the mounting bracket (220) to form the electrically conductive strip (224), serving as a component of the antenna (280) reduces cost, because no components solely dedicated to the antenna are required. Further, the electrically conductive strip (224) of the antenna (280) may be positioned in a region that is not covered by the touchpad (210). Accordingly, the touchpad itself, including the sensing electrodes of the touchpad may not attenuate the electromagnetic field of the antenna. Similarly, the likeliness of the electromagnetic field associated with NFC operation interfering with capacitive touch sensing using the touchpad is reduced.

While FIGS. 2A and 2B show a configuration of components, other configurations may be used without departing from the scope of the disclosure. For example, various components may be combined to create a single component. As another example, the functionality performed by a single component may be performed by two or more components or by a different component. For example, instead of using a segment of the mounting bracket (220) to provide the electrically conductive strip, the electrically conductive strip may be directly drawn on the PCB of the touchpad assembly.

Figure 3:
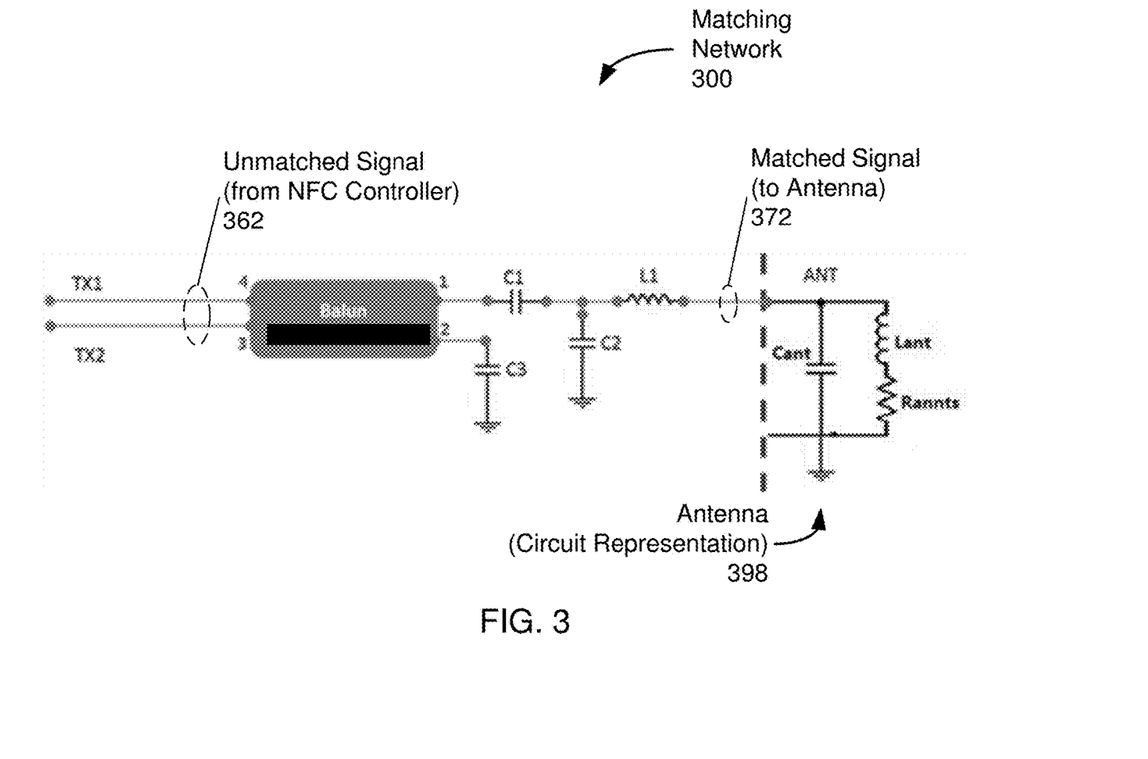
FIG. 3 shows a matching network, in accordance with one or more embodiments.

Turning to FIG. 3, a matching network, in accordance with one or more embodiments, is shown. The matching network may perform an impedance matching between the NFC controller (260) and the antenna (280). A mismatch of the impedances of the NFC controller (260) and the antenna (280) may result in a reduced current in the antenna (280) which, in turn, may result in a reduced electromagnetic field of the antenna (280). The impedance matching may, thus, improve the performance of the NFC module (160). The matching network (300) may perform the impedance matching to compensate for the impedance mismatch. Specifically, in FIG. 3, the matching network (300) converts the unmatched signal (362) at the output of the NFC controller (260) into a matched signal (372) for the antenna (280).

In one or more embodiments, the NFC controller (260) is designed to operate in conjunction with a conventional NFC antenna which may include a dedicated multiturn coil and/or a ferrite. Accordingly, the NFC controller (260) is designed for an impedance of the conventional antenna with a multiturn coil and/or a ferrite. Unlike the conventional antenna, the antenna (280) includes neither a multiturn coil nor a ferrite. Accordingly, the inductance of the antenna (280) is lower than the inductance of the conventional antenna, thereby causing an impedance mismatch, if directly connected to the NFC controller (260).

In FIG. 3, a circuit representation of the antenna (398), including an antenna inductance, $L_{ant}$, an antenna resistance, $R_{annts}$, and an antenna capacitance $C_{ant}$, is shown. In the circuit representation, $L_{ant}$ is lower than $L_{ant}$ of the conventional antenna because the antenna (280) does not include a multiturn coil. In order to compensate for the lower $L_{ant}$, the matching network includes a matching impedance L1. L1 may be a coil inductance providing an inductance in addition to $L_{ant}$ of the antenna (280) to approximate $L_{ant}$ of a conventional antenna. L1 may be, for example, 56 nH. L1 may have a high-quality factor (high Q) to allow for lower losses at higher frequencies. Accordingly, using an L1 with a high Q, the antenna (280) may be driven with a higher current, e.g., up to 1 A, which may result in a stronger electromagnetic field at the antenna (280).

In one or more embodiments, the unmatched signal (362) is a differential signal. A balun is used to convert the differential signal into the single-ended signal required for the antenna (398). The balun may be selected to support a high current. Assume, for example, that the output of the NFC controller (260) is a 5V signal. Further assume that the overall impedance (matching network (270) and antenna (280)) is 8 Ohms. In this scenario, the balun needs to accommodate a current of 0.625 A. A balun may not be needed if the NFC controller provides a single-ended signal.

The matching network (300) may further include additional components such as the capacitances $C_1$, $C_2$, and $C_3$ to complete the matching network (300). Any components such as resistances, capacitances, and inductances in any combination may be part of the matching network to perform the impedance matching.

Figure 4A:
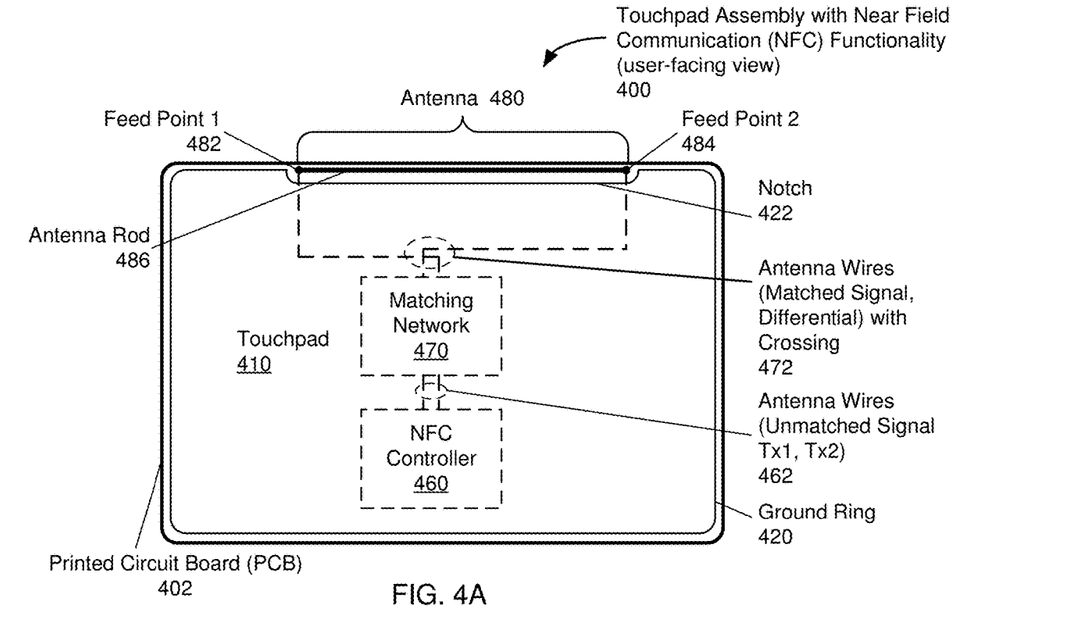
FIGS. 4A and 4B show touchpad assemblies with NFC functionality, in accordance with one or more embodiments.
Figure 4B:
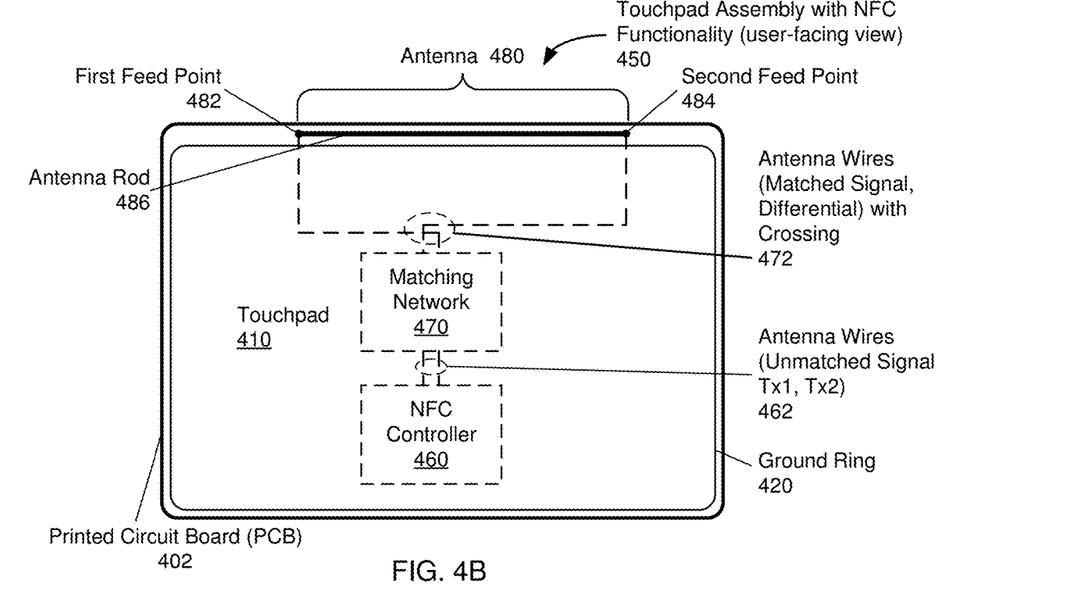

Turning to FIGS. 4A and 4B, touchpad assemblies with NFC functionality, in accordance with one or more embodiments, are shown. FIG. 4A provides a user-facing view (400) of a touchpad assembly with NFC functionality, and FIG. 4B provides a user-facing view (450) of a touchpad assembly with NFC functionality. One difference between the embodiment shown in FIG. 4A and the embodiment shown in FIG. 4B is the placement of the antenna providing NFC functionality, as further discussed below.

Each of the touchpad assemblies shown in FIGS. 4A and 4B includes a touchpad (410), a ground ring (420), and various elements of the NFC module (160), such as an NFC controller (460), and an antenna (480). Components shown using dashed lines may not be visible in the user-facing view. For example, the PCBs (402) of the touchpad assemblies may include multiple layers (e.g., two, three, four or more layers), and the matching network (470) and the NFC controller (460) may be surface-mounted on a bottom layer of the PCB. Various other components of the NFC module (160) may be included, such as a matching network (470) and/or antenna wires (462, 472). Each of these components is subsequently described.

The touchpad (410) may be any kind of touchpad providing a sensing region, as previously described. The ground ring (420) may be any kind of electrically conductive structure that surrounds the touchpad (410). In one or more embodiments, the ground ring (420) is a metallic ring shaped according to the perimeter of the touchpad (410). When the touchpad assembly (400) is integrated in an electronic system, such as a laptop, a payment terminal, a gaming device, etc., the ground ring (420) may be electrically connected to the ground of the electronic system. The ground ring (420) may be disposed on the top layer of the PCB (402). The top layer may also accommodate sensor electrodes for touch sensing.

In one or more embodiments, the antenna (480) includes an antenna rod (486). The antenna rod (486) may be a wire which may have a length and a diameter. The length may be selected based on the desired size of the region where NFC communication is possible. Accordingly, the antenna rod (486) may have a certain length, for example, at least 3 cm, at least 4 cm, or at least 5 cm. In one or more embodiments, the antenna rod is straight and does not include a coiled section. The antenna (480) may be disposed on the top layer of the PCB (402).

A first end of the antenna rod (486) may form a first feed point (482) of the antenna (480). A second end of the antenna rod (486) may form a second feed point (484) of the antenna (480).

The NFC controller (460) may be any type of NFC controller for transmitting and/or receiving NFC data using the antenna (480). The NFC controller (460) may be similar to the NFC controller (260), and the operation of the NFC controller (460) when driving the antenna (480) may be as described in reference to FIGS. 2A and 2B. The interface with the antenna (480) may be via two antenna wires (462). In one or more embodiments, the signal provided at the output of the NFC controller (460) via the two antenna wires (462) is a differential signal consisting of Tx1 and Tx2. Alternatively, the signal provided at the output of the NFC controller (460) via the two antenna wires (462) may be a single-ended signal. One or more embodiments include a matching network (470) between the NFC controller (460) and the antenna (480), for the reasons discussed in reference to FIGS. 2A and 2B. The matching network (470) may perform an impedance matching between the NFC controller (460) and the antenna (480). The antenna (480) may receive the differential, matched signal at the output of the matching network (470) via antenna wires (472). In one embodiment, the antenna wires (472) cross at the output of the matching network (470), as illustrated in FIGS. 4A and 4B. The crossing may result in the antenna (480) (including the antenna rod (486)) and the antenna wires (472) forming a full loop. When driving the antenna, an electromagnetic field may be generated along the antenna wires (472) and along the antenna rod (486). As a result of the full loop, the electromagnetic field may be present in a large area in the region of the touchpad (410).

The NFC controller (460), the matching network (470), and/or other components may be placed on the backside (bottom) of the touchpad (410). The NFC controller (460), the matching network (470), and/or the other components may be mounted on a printed circuit board (PCB) that may also support components of the touchpad, e.g., sensor electrodes, traces for the sensor electrodes, and/or elements of the processing system, etc.

Referring specifically to the embodiment shown in FIG. 4A, the antenna rod (486) is disposed outside the perimeter of the touchpad (410), accommodated by a notch (422) in the ground ring (420). No sensor electrodes may be in the area of the notch (422), and accordingly, no touch sensing may be available in the area of the notch (422). In one embodiment, the ground ring (420) is incomplete. More specifically, in order to accommodate the antenna rod (486), the ground ring (420) is interrupted by a gap at the location of the antenna rod (486). In comparison to an embodiment with a continuous ground ring, slightly more area of the touchpad may be available for touch sensing. In one embodiment, the area occupied by the antenna rod (486) is clear of conductive elements such as electrical traces, sensor electrodes, etc., on all layers of the PCB (402), or on one or more layers of the PCB (402) closed to the antenna rod (486). The location of the antenna rod (486) may be approximately at the edge of the touchpad (410). When the touchpad assembly (400) is installed in an electronic system, all components of the antenna (480), including the antenna rod (486) may be located on the PCB (402) of the touchpad assembly (with the antenna rod (486) on the user-facing side and other components on the bottom side). Accordingly, the touchpad assembly (400) forms a compact self-contained unit.

Referring specifically to the embodiment shown in FIG. 4B, unlike in FIG. 4A, the antenna rod (486) is disposed outside the perimeter of the touchpad (410). No notch may be required in the surface area of the touchpad (410). Accordingly, the full surface area of the touchpad (410) may be available for touch sensing.

While FIGS. 4A and 4B show a configuration of components, other configurations may be used without departing from the scope of the disclosure. For example, various components may be combined to create a single component. As another example, the functionality performed by a single component may be performed by two or more components. The touchpad assemblies (400, 450) of FIGS. 4A and 4B may further include mounting elements, e.g., as shown in FIGS. 2A and 2B.

Figure 5:
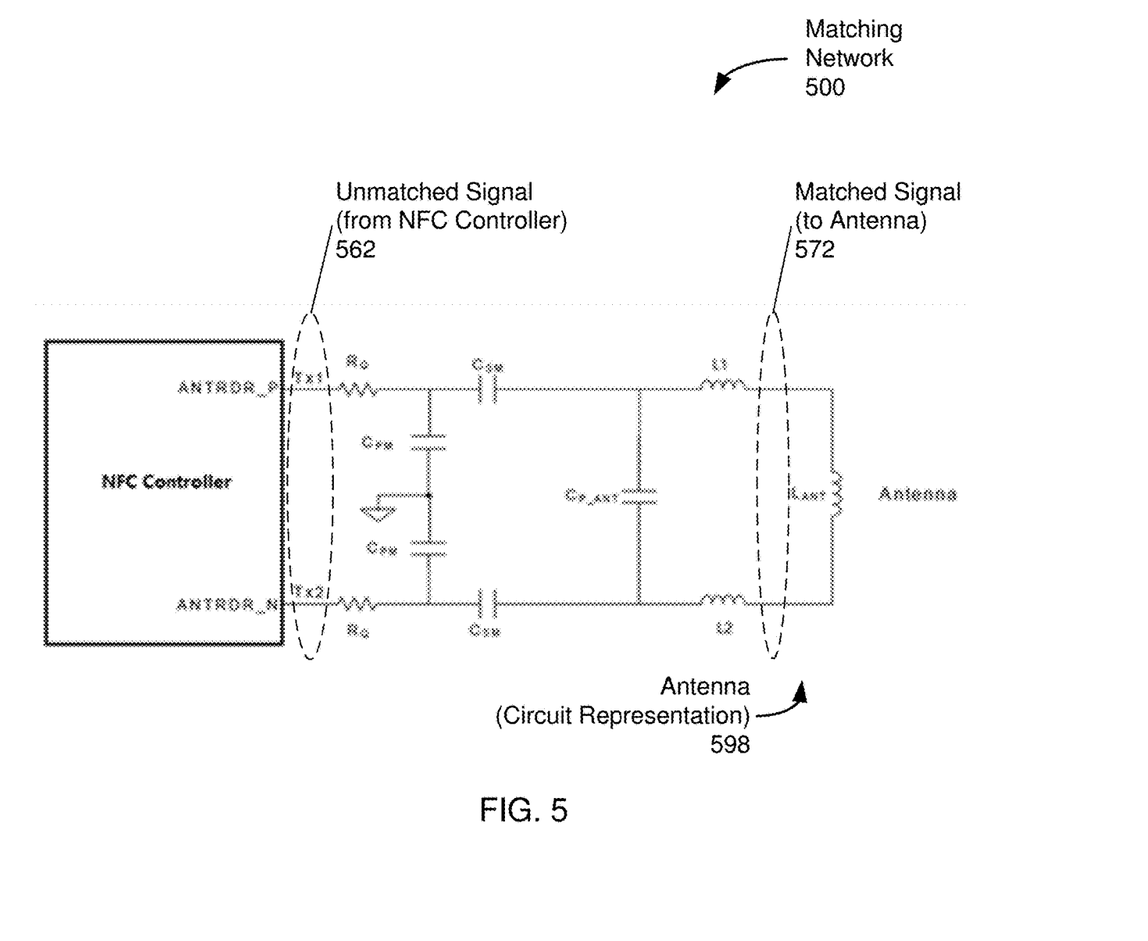
FIG. 5 shows a matching network, in accordance with one or more embodiments.

Turning to FIG. 5, a matching network, in accordance with one or more embodiments, is shown. The matching network (500) may perform an impedance matching between the NFC controller (460) and the antenna (480), for the reasons previously described in reference to FIG. 3. The matching network (500) may convert the unmatched signal (562) at the output of the NFC controller (460) into a matched signal (572) for the antenna (480).

In FIG. 5, a circuit representation of the antenna (598), including an antenna inductance, $L_{ANT}$, and an antenna capacitance $C_{P\_ANT}$, is shown. In the circuit representation, $L_{ANT}$ is lower than $L_{ANT}$ of a conventional antenna because the antenna (480) does not include a multiturn coil. In order to compensate for the lower $L_{ANT}$, the matching network includes two matching impedances, L1 and L2. L1 and L2 may be coil inductances providing inductances in addition to $L_{ANT}$ of the antenna (480) to approximate $L_{ANT}$ of a conventional antenna. L1 and L2 may have a high-quality factor (high Q) to allow for lower losses at higher frequencies. L1 and L2 may be installed in close proximity to the antenna rod (486). For example, L1 may be installed at the first feed point (482) (i.e., in close proximity to the first feed point), and L2 may be installed at the second feed point (484) (i.e., in close proximity to the second feed point). Accordingly, using L1 and L2 with a high Q, the antenna (480) may be driven with a higher current, e.g., up to 1 A, which may result in a stronger electromagnetic field at the antenna (480).

The matching network (500) may further include additional components such as the capacitances $C_{SM}$, $C_{PM}$, and the resistances $R_Q$ to complete the matching network (500). Any components such as resistances, capacitances, and inductances in any combination may be part of the matching network to perform the impedance matching.

Figure 6A:
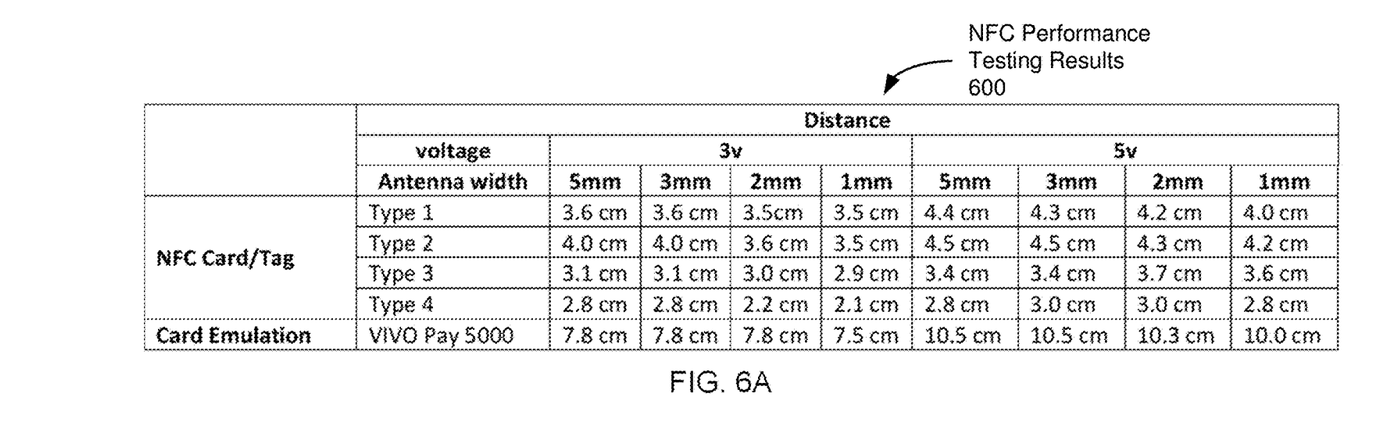
FIG. 6A shows NFC performance testing results of a touchpad assembly with NFC functionality, in accordance with one or more embodiments.
Figure 6B:
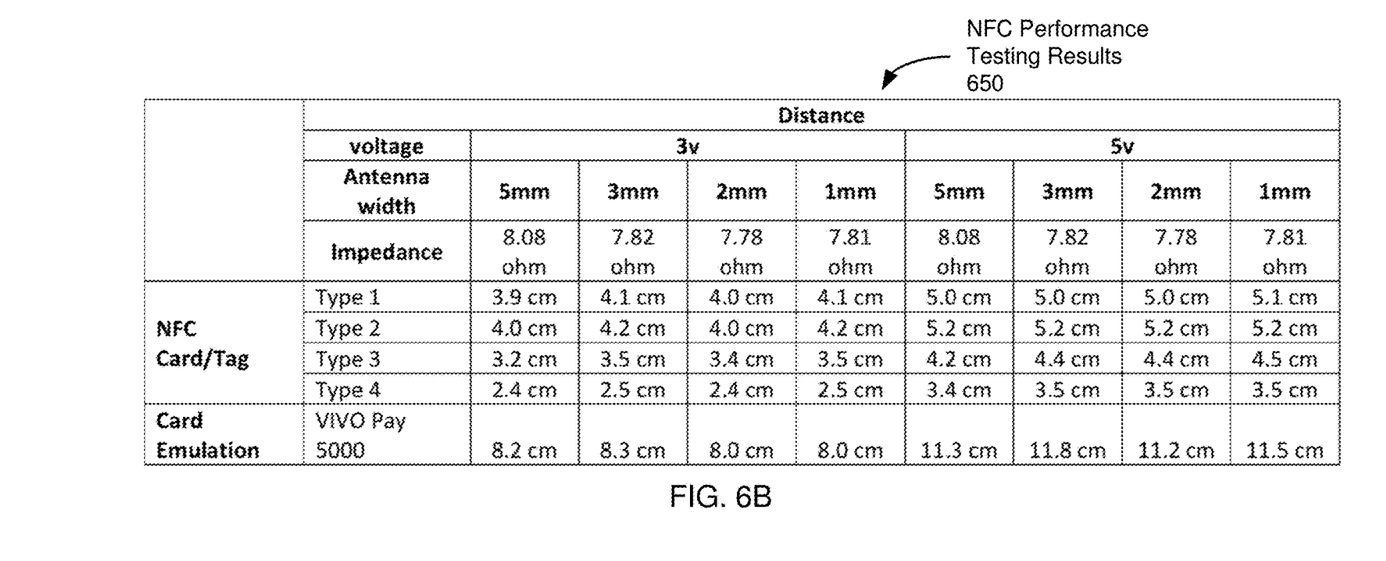
FIG. 6B shows NFC performance testing results of a touchpad assembly with NFC functionality, in accordance with one or more embodiments.

FIGS. 6A and 6B provide NFC performance testing results of touchpad assemblies with NFC functionality, in accordance with one or more embodiments. The test results include maximum distances at which an NFC communication was successfully performed. Increased distance suggests better performance. The distances were measured for various different parameters: (i) different NFC devices (four NFC cards/tags and one card emulation device); (ii) two different voltages used for driving the antenna (3V and 5V); (iii) four different antenna widths/diameters (1 mm, 2 mm, 3 mm, and 5 mm).

Turning to FIG. 6A, the testing results (500) for an embodiment with an antenna in a single-ended configuration, e.g., as described in reference to FIGS. 2A, 2B, and 3, are shown. The results suggest that an acceptable range is achieved.

Turning to FIG. 6B, the testing results (500) for an embodiment with an antenna in a differential configuration, e.g., as described in reference to FIGS. 4A, 4B, and 5, are shown. The results suggest that an acceptable range is achieved.

In direct comparison, the embodiment with the antenna in a differential configuration appears to provide a slightly better range than the embodiment with the antenna in the single-ended configuration.

Embodiments of the disclosure, thus, augment input devices with NFC capabilities. Embodiments of the disclosure do not require a traditional antenna composed of a coil and a ferrite. Despite the elimination of the traditional antenna, embodiments of the disclosure, may use an NFC controller as it is commonly used in conjunction with a traditional antenna.

The overall cost of touchpad assemblies with NFC functionality may be reduced as a result of the elimination of the conventional antenna. Further, due to the placement of the antenna, the NFC performance is not affected by the touchpad, and the touchpad performance is not affected by the electromagnetic field emitted by the antenna. Specifically, because the antenna is placed outside the perimeter of the touchpad, the components of the touchpad (e.g., a metal mesh structure of the touchpad sensor) may not attenuated the electromagnetic field. Similarly, the electromagnetic emissions by the antenna are less likely to affect the sensing by the touchpad sensor.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device, comprising:
   a touchpad;
   a mounting bracket, adjacent to the touchpad, made of an electrically conductive material and configured to anchor the touchpad in an electronic system;
   a near field communication (NFC) controller; and
   an antenna electrically interfaced with the NFC controller,
      wherein the antenna comprises an electrically conductive strip formed by a segment of the mounting bracket, and
      wherein the electrically conductive strip is partially separated from the mounting bracket by a U-shaped gap establishing a free end of the electrically conductive strip, wherein the U-shaped gap is within the mounting bracket.

2. The input device of claim 1,
   wherein the electrically conductive strip is outside a perimeter of the touchpad.

3. The input device of claim 1,
   wherein the electrically conductive strip comprises a first feed point at the free end.

4. The input device of claim 3,
   wherein the first feed point receives a single-ended signal from the NFC controller.

5. The input device of claim 4,
   wherein the electrically conductive strip comprises a second feed point at a connected end of the electrically conductive strip, and
   wherein the second feed point is connected to ground.

6. The input device of claim 1, further comprising:
   a matching network disposed between the NFC controller and the antenna.

7. The input device of claim 6,
   wherein the matching network is configured to convert a differential signal provided by the NFC controller into a single-ended signal for the antenna.

8. The input device of claim 6,
   wherein the matching network is configured to perform an impedance matching between the NFC controller and the antenna.

9. The input device of claim 8,
   wherein the matching network comprises a matching impedance with a high-quality factor.

* * * * *